Nov. 10, 1931.                    E. F. ROSSMAN                         1,831,141
                              HYDRAULIC SHOCK ABSORBER
                         Filed Jan. 29, 1929        2 Sheets-Sheet 1
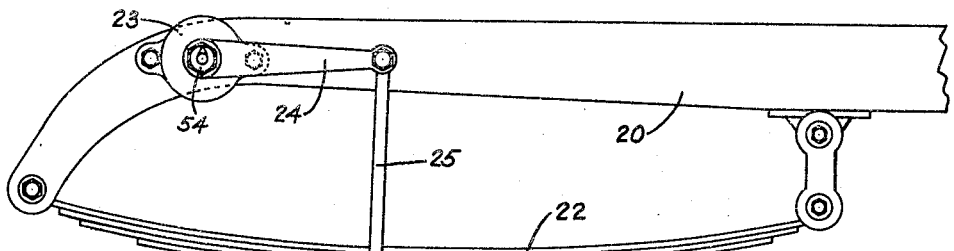
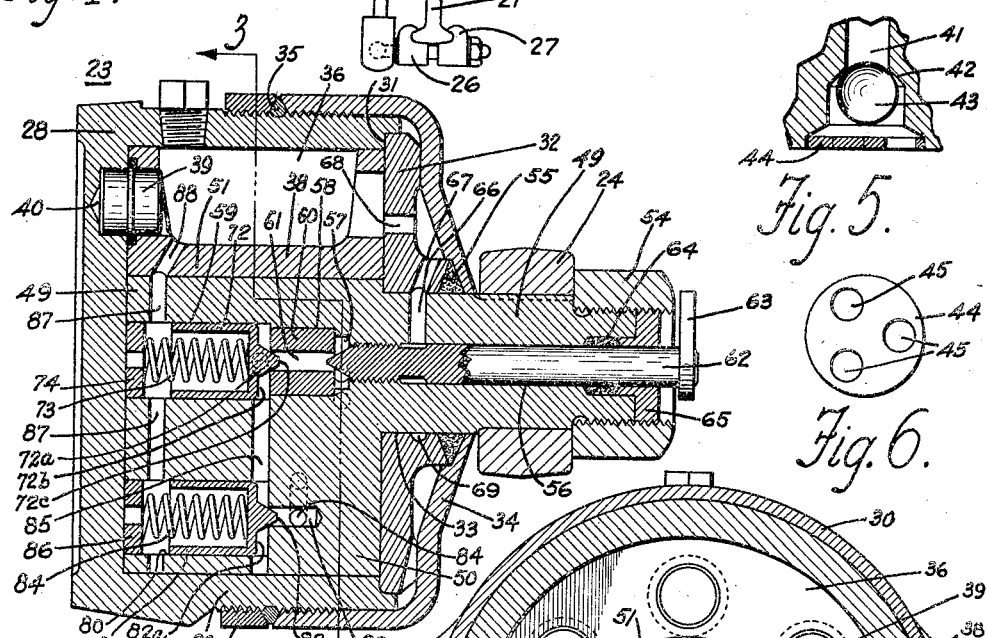
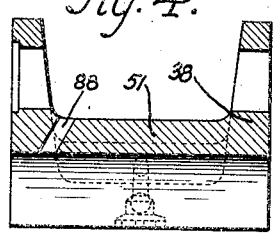

Nov. 10, 1931.   E. F. ROSSMAN   1,831,141
HYDRAULIC SHOCK ABSORBER
Filed Jan. 29, 1929   2 Sheets-Sheet 2

Inventor
Edwin F. Rossman
By Spencer, Hardman & Fehr
His Attorneys

Patented Nov. 10, 1931

1,831,141

UNITED STATES PATENT OFFICE

EDWIN F. ROSSMAN, OF DAYTON, OHIO, ASSIGNOR TO DELCO PRODUCTS CORPORATION, OF DAYTON, OHIO, A CORPORATION OF DELAWARE

HYDRAULIC SHOCK ABSORBER

Application filed January 29, 1929. Serial No. 335,821.

This invention relates to improvements in shock absorbers particularly adapted to control the movement of two relatively movable members, for instance, the frame and axle of a vehicle.

It is among the objects of the present invention to provide a double-acting hydraulic shock absorber, capable of controlling both the approaching and separating movements of a vehicle frame and axle whereby road shocks are dissipated.

Further objects and advantages of the present invention will be apparent from the following description, reference being had to the accompanying drawings, wherein a preferred form of the embodiment of the present invention is clearly shown.

In the drawings:

Fig. 1 is a fragmentary view showing the front end of a vehicle frame supported on the axle, the shock absorber embodying the present invention being shown applied thereto.

Fig. 2 is a cross sectional view taken through the center of the shock absorber.

Fig. 3 is a sectional view taken along the line 3—3 of Fig. 2.

Fig. 4 is a detail cross sectional view of the partition within the shock absorber casing.

Fig. 5 is a fragmentary sectional view on an enlarged scale of one of the check valves in the partition.

Fig. 6 is a detail view on an enlarged scale showing the retainer plug of the valve shown in Fig. 5.

Figure 7:
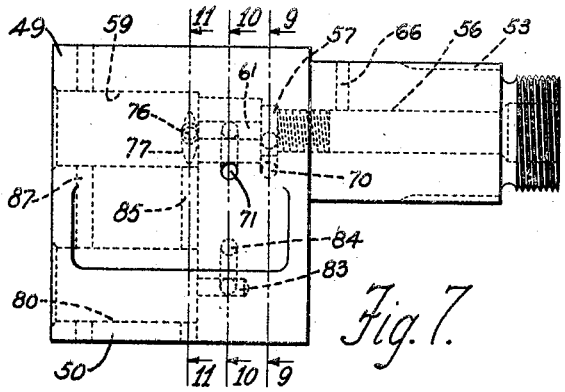
Fig. 7 is a side view of the piston of the shock absorber.
Figure 8:
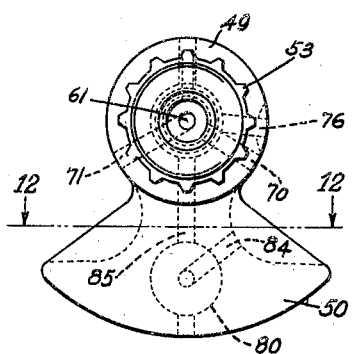
Fig. 8 is a front end view of the piston shown in Fig. 7.
Figure 9:
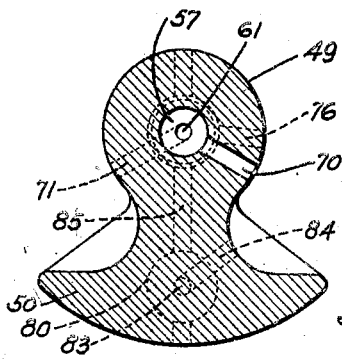
Fig. 9 is a detail sectional view of the piston taken along the line 9—9 of Fig. 7.
Figure 10:
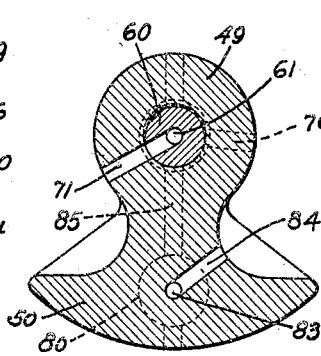
Fig. 10 is a view similar to Fig. 9 taken along the line 10—10 of Fig. 7.
Figure 11:
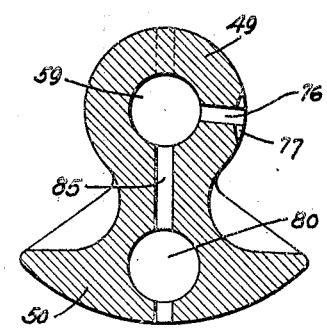
Fig. 11 is a view similar to Figs. 9 and 10 taken along the line 11—11 of Fig. 7.

Referring to the drawings, the numeral 20 designates the frame of the vehicle supported on the axle 21 by springs 22, only one of which is shown. The road wheels of the vehicle (not shown) are mounted upon the axle 21. The shock absorber, designated as a whole by the numeral 23, has an operating arm 24, the free end of which is connected with one end of the connecting link 25, the other end of said link being attached to a bracket 26, secured to the axle 21 by the clamping member 27.

The shock absorber comprises a casing 28, cup-shaped, the outer portion of the cylindrical wall 29 being provided with screw threads. A clamping ring 30 is screw-threadedly mounted upon the cylindrical wall 29 of the casing. The outer edge of the cylindrical wall 29 of the casing has an annular recess 31 into which the end-wall member 32 is pressed. The end-wall 32 provides a bearing portion 33 for purposes to be described.

A cup-shaped end-cover member 34 is screw-threadedly received by the cylindrical wall 29 of the casing, said end-cover member having a central opening alined with the bearing portion 33 of the end-wall member 32. A sealing ring 35 of rubber, lead, or any other suitable material is interposed between the edge of the end-cover member 34 and the clamping ring 30 whereby when the clamping ring is rotated upon the cylindrical wall 29 of the casing so as to move toward the end-cover member 34, the sealing ring 35 will be wedged tightly between the edge of the clamping ring 30 and the edge of the end-cover member 34 substantially sealing this joint against fluid leaks.

The casing 28 is divided into a fluid reservoir 36 and a piston chamber 37 by the partition 38 which is located and maintained in proper position within said casing by a series of plugs 39 fitting into openings 40 in the end or bottom wall of the casing 28 and into apertures properly provided in one wall of the partition 38.

Adjacent each end of the partition 38 there is provided a passage 41 forming communication between the fluid reservoir 36 and the piston chamber 37, each passage having a seat portion 42 adapted to be engaged by the ball check-valve 43, which is retained within its chamber by the disc-plug 44. Each disc-plug has a series of holes 45 so spaced that they will not be closed by the check valve 43 at any time. Plug 44 may be secured in the partition in any suitable manner, however applicant has preferred initially to make said plug dish-shaped, to be inserted in its proper opening in the partition and then flattened so that it will be expanded against the edge of the aperture into which it fits and thereby secured therein. These check valves form means for supplying fluid to the piston chamber when it is necessary to replenish the supply therein, due to fluid leaks.

The piston chamber 37 is divided into two compartments 46 and 47 respectively, by the oscillatable piston 48, said compartments being referred to hereinafter as the compression check compartment 46 and the rebound check compartment 47. Piston 48 comprises a hub portion 49 and a vane portion 50, clearly illustrated in the Figs. 7 to 12 inclusive. The hub portion 49 of the piston is rotatably supported by the bearing 33 provided by the end-wall member 32, a portion of the hub 49 being journalled in the arcuate portion 51 of the partition member 38. The arcuated end of the vane portion 50 of the piston is slidably supported by the inner surface of the cylindrical wall 29 of the casing 28 so that piston 48 is oscillatably supported by the bearing portion 33 of the end wall member 32, the arcuate wall 51 of the partition 38 and the cylindrical wall surface of the casing 28. The hub portion 49 of the piston 48 extends through bearing 33 and the alined opening in the end member 34 to the outside of the shock absorber, said hub portion having a grooved and ribbed portion 53 provided adjacent the outside of the end-cover member 34, the shock absorber operating arm 24 being mounted upon said grooved and ribbed portion 53. A clamping nut 54, screw-threadedly mounted upon the end portion 49 of the piston, clamps the operating arm 24 upon the piston hub. A packing 55 surrounds the hub portion 49 of the piston and is clamped between the end-wall member 32 and the end-cover member 34, thereby substantially preventing any fluid leak along the bearing 33 to the outside of the shock absorber.

As shown in Figs. 2 and 7, hub portion 49 of the piston has a longitudinal passage coaxial thereof, said passage comprising four portions of different diameters, the smaller portion being referred to by the numeral 56, the second smallest portion by the numeral 57, the second largest portion by the numeral 58, and the largest portion by the numeral 59. Within the passage portion 58 there is tightly pressed a tubular member 60, the passage through said tubular member being designated by the numeral 61, said passage being of lesser diameter than the portion 57 of the longitudinal passage through the piston hub. In Fig. 2 it may be seen that the passage portion 57 provides a chamber between the tubular member 60 and the passage portion 56. Adjacent the chamber 57, passage portion 56 is provided with screw threads for receiving a screw threaded end of the adjustable metering pin 62 which is rotatably supported within the passage portion 56 and has an indicator arm 63 secured at the outer end, said indicator arm lying adjacent to the outer surface of the clamping nut 54 upon which certain indications may be provided showing to what degree the metering pin 62 is being adjusted. A packing 64 fits into a recess provided in the end of the hub 49 and is tightly pressed into engagement with the metering pin 62 by the packing gland 65 screw threadedly received by the clamping nut 54, as shown in Fig. 2. The inner end of the metering pin 62 is tapered and extends from the passage 56 through the chamber 57 into the one end of the tubular member 60, restricting the opening of this end of the passage 61, said restriction being variable by the adjustment of the metering pin 62. An annular groove provided in the metering pin aligns with a passage 66 provided in the hub 49, said passage in turn aligning with another passage 67 provided in the end-wall member 32, which passage opens into a space provided between the end-wall member 32 and the end-cover member 34. This space in turn is in communication with the fluid reservoir 36 through passage 68, thus any fluid tending to leak along the screw-threaded portion of the metering pin 62 will be directed back to the fluid reservoir 36 through passages 66, 67 and 68. An annular groove 69 is provided in the bearing portion 33 of the end wall member 32, said annular groove connecting with the passage 67 so that any fluid having a tendency to leak along the bearing portion 33 will be directed back into the fluid reservoir through passages 67 and 68. Chamber 57 is in communication with the compression check compartment 46 through a duct or passage 70 provided in the hub portion 49 of the piston.

The duct or passage 61 of the tubular member 60 is in communication with the rebound check compartment 47 by the duct or passage 71 extending through the hub portion 49 of piston and through the tubular member 60. Thus the means adapted to provide a constantly restricted flow of fluid from one of the compartments of the casing into the other in response to the movement of the piston in both directions, comprises ducts or passages 70, 57, 61 and 71, the flow of fluid through said passages depending upon the direction of movement of the piston.

The largest diameter portion 59 of the passage longitudinal of the hub portion 49 of the piston has a piston valve 72 slidably supported therein. This piston valve is recessed for receiving one end of a spring 73, the other end of said spring engaging a retaining washer 74 pressed into the end of the passage portion 59 so as to be rigidly retained therein. The member 74 is in the form of a washer so as to permit introduction of a tool into the opening therein to remove the same when it is so desired.

The piston valve 72 is of the double-headed type, the one end of said valve terminating in a frustro-conical formation 72a, the end surface of the valve about the larger base of the frustrum providing the larger head portion 72b, the smaller base of the frustrum providing the smaller head portion 72c of the piston valve. Spring 73 urges the valve 72 to the right as regards Fig. 2, so that the frustro-conical portion of said valve enters passage 61 and closes the one end thereof, the smaller base of the frustrum being exposed to fluid pressure within the passage 61. The larger head portion 72b of the valve is held spaced from the end of the tubular member 60 due to the fact that the peripheral edge of the passage 61 at its one end engages the frustrum more adjacent its smaller base. From this it may be seen that a greater pressure is necessary on the smaller piston valve head 72c than on the larger head portion 72b to move the valve 72 to open passage 61 against the effect of spring 73.

The space between the piston valve head 72b and the tubular member 60 is in communication with the compression check compartment 46 by a passage or duct 76 provided in the hub portion of the piston and angularly disposed to the passage 70. At the mouth of passage 76 the outer face of the hub portion has a slot 77. As shown in the Fig. 3, when the piston 48 is in the normal intermediate position, the mouth of passage 76 is located beneath the edge of the partition 38, said passage or duct 76 being gradually closed and communication between the compression check compartment 46 and the space between valve 72 and tubular member 60 shut off as the piston 48 moves counterclockwise as regards Fig. 3, or more specifically in a direction to reduce the volume of the compression check compartment 46.

Within the vane portion 50 of the piston 48 there is provided a recess 80 substantially parallel to the longitudinal passage through the hub portion 49 of the piston, said recess 80 corresponding in size to the portion 59 of said passage. A piston valve 81 similar to the valve 72 is slidably supported in the recess 80, said piston valve presenting a double-headed end, the smallest portion being designated by the numeral 82, the larger headed portion 82a is spaced from the inner wall of the recess 80 by the engagement of the frustro-conical protuberance of the valve with the outer peripheral edge of a duct 83 extending from the recess 80 into the piston vane 50. Duct 83 is in communication with the compression check compartment through duct or passage 84. The spring which urges the piston valve 81 to cause its frustrum to close the end of duct 83 is designated by the numeral 84. Usually the spring 84 is normally twice the strength of spring 73, or more specifically exerts twice the pressure upon its valve than does the spring 73 upon the valve 72.

The inner end of recess 80 is in communication with the space between the piston valve 72 and the tubular member 60, by a duct or passage 85. The end of said recess 80 adjacent the retaining washer 86, which maintains spring 84 in position, is in communicaton with the corresponding end of the passage portion 59 by duct or passage 87, passage portion 59 being in turn in communication with the fluid reservoir 36 by an extension of duct 87 and a communicating duct 88 provided in the partition 38. Any fluid pressure behind the valves 72 and 81 will thus be relieved through ducts 87 and 88 leading to the fluid reservoir 36.

Figure 13:
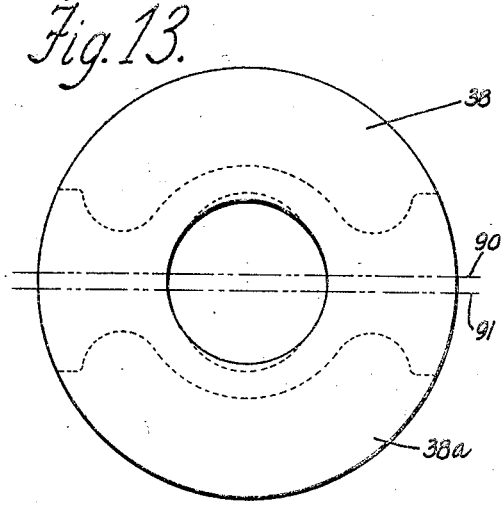
Fig. 13 is a side view of the disc from which two partitions of the shock absorber are adapted to be formed.
Figure 12:
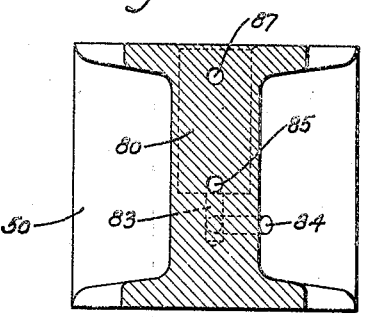
Fig. 12 is a detail sectional view taken along the line 12—12 of Fig. 8.

The Fig. 13 illustrates a disc which when cut along the lines 90 and 91 provides a pair of partition members 38 and 38a.

The operation of the device will now be described.

When the wheels of the vehicle strike an obstruction in the roadway, the axle 21 will force the spring 22 upwardly toward the frame, flexing said spring. This movement of the axle 21 toward the frame 20 causes the connecting link 25 to move the operating arm 24 in a counterclockwise direction and thus the piston 48 is moved in a similar direction, causing said piston to decrease the volume of the compression check compartment 46 and increase the volume of the rebound check compartment 47. Fluid within compartment 46 may be forced therefrom through three different paths. The first path is a constantly restricted one and comprises duct or passage 70 into chamber 57, past the end of the metering pin, restricting the opening of passage 61, and thence from said passage 61 through the passage 71 into the rebound check compartment. If, during the initial movement of the piston, that is during the time in which the passage 76 is still not covered by the edge of the partition 38, pressure within the compression check compartment 46 rises to a predetermined value, said fluid pressure flowing through duct or passage 76 into the space between the piston valve 72 and the tubular member 60 will exert a push against the larger head portion of said piston valve and move it against the effect of its spring 73 to open the passage 61 (at the end opposite the metering pin restriction) thus a flow of fluid is established from the space ahead of the piston 72 through passages or ducts 61 and 71 into the rebound check compartment 47 thereby the pressure after reaching said predetermined value will further be relieved. If the pressure within the compression check compartment 46 exceeds the aforementioned predetermined rise in pressure, or more specifically if said pressure reaches a still greater, predetermined increase, fluid in the passages 84 and 83 will exert a pressure upon the smaller head portion 82 of the valve 81 and force said valve, against the effect of spring 84, to open communication between the recessed portion 80 ahead of valve 81 and the passage or duct 83, thus permitting said fluid to flow from duct 83 past valve 81 through passage 85 and if valve 72 has not been already opened by the fluid flowing through passage 76 pressure from the passage 85 upon the larger head portion of piston 72 will be sufficient to move said piston 72 against the effect of its spring 73 to open communication between ducts 85 and 61 and thus the fluid from said duct 85 will flow through ducts 61 and 71 into the rebound check compartment 37, thereby relieving the excessive pressure in the compression check chamber through passages 84, 83, 85, 61 and 71. The restriction of the flow of fluid from the compression check compartment 46 as the piston moves in the counterclockwise direction, resists the movement of the piston 48 in said counterclockwise direction, thus the movement of spring 22 as it is flexed toward the frame 20 will likewise be resisted and consequently the shocks resulting from striking the obstruction in the roadway will substantially be absorbed.

When the spring 22 is in flexed position, that is, in a position near the frame 20, the piston 48 will have moved to the right as regards Fig. 3, or more specifically the compression check chamber 46 will be of comparatively smaller volume than the rebound check chamber 47. In returning to its normal position, spring 22 will cause the connecting link 25 to move arm 24 in a clockwise direction, thus piston 48 is moved clockwise and pressure is exerted upon the fluid within the rebound check chamber. Under ordinary pressures upon the fluid in said rebound check chamber 47, fluid will flow through duct or passage 71 into the passage 61, thence past the metering pin 62 into the chamber 57 and through passage 70 into the compression check compartment 46, the restriction of passage 61 by the tapered end of the metering pin 62 causing the fluid to resist the movement of the piston 48 in said clockwise direction. If the pressure upon the fluid in the rebound check compartment 47 exceeds a predetermined value, the fluid acting upon the smaller piston head portion 72c of the piston valve 72 will move said piston valve against the effect of its spring 73 to open the end of the passage 61, thus fluid will flow from said passage 61 past the piston head valve 72 into the passage or duct 85, the fluid pressure then acting upon the larger piston head portion of the piston valve 81 and moving said piston valve against the effect of its spring 84 to open the passage or duct 83. Fluid will now enter through duct 83 into and through duct or passage 84 and flow into the compression check compartment 46. This second flow of fluid from the rebound check compartment to the compression check compartment relieves the rebound check compartment of any excessive fluid pressures therein, the resistance to the return of the spring 22 to its normal position still being maintained and thus a rebounding return movement of the spring is substantially prevented.

The valves, including ball check valves 43, are adapted to introduce fluid into either one of the compartments when the fluid supply therein needs replenishing due to fluid leaks from said compartments.

Applicant has provided a device of simple and compact design, yet constructed sufficiently sturdy to withstand the heavy impacts caused by the road wheels of the vehicle striking comparatively large obstructions or ruts in the roadway.

Applicant's device has been simplified by the provision of relief valves adapted to be brought into effect by the flow of fluid through a passage in either direction, the flow in the one direction requiring a greater pressure to open the valve to relieve said pressure than the flow of fluid flowing in the other direction in said passage.

The device may easily be adjusted from outside of the casing by operation of lever 63 so as to meet the various requirements of the different vehicles upon which the shock absorber may be attached. Springs 73 and 84 may also be changed to alter the resisting effects of the device.

While the form of embodiment of the present invention as herein disclosed, constitutes a preferred form, it is to be understood that other forms might be adopted, all coming within the scope of the claims which follow.

What is claimed is as follows:

1. A shock absorber comprising, in combination, a casing providing a piston chamber; a piston movable within said chamber and dividing it into two compartments respectively; means adapted to provide a constantly restricted flow of fluid from one compartment to the other in response to the movements of the piston in both directions; and a pair of pressure release valves carried by the piston, one of said valves being common to both of said compartments and being adapted to act as a low pressure release valve for the one compartment as the piston moves in one direction, and as a high pressure release valve for the other compartment as the piston moves in the opposite direction, the other valve being adapted to act as a high pressure release valve for the said one compartment as the piston moves in the said one direction.

2. A shock absorber comprising, in combination, a casing providing a piston chamber; a piston movable within said chamber and dividing it into two compartments; means adapted to provide a constantly restricted flow of fluid from one compartment into the other in response to the movement of the piston in both directions; ducts in said piston providing communication between said compartments; and a piston valve carried by the piston, normally urged to close communication between the compartments through said ducts, said piston valve having a lesser area exposed to the one compartment than to the other, whereby greater fluid pressure is necessary in the said one compartment than in the other to move said valve to open communication between said compartments through said ducts.

3. A shock absorber comprising, in combination, a casing providing a piston chamber; a piston movable within said chamber and dividing it into two compartments; means adapted to establish a constantly restricted flow of fluid from one compartment into the other in response to movement of the piston in both directions; means for establishing additional flow of fluid from one compartment into the other in response to varying fluid pressures within said compartments respectively, said means comprising spring loaded, piston valves so constructed and arranged that certain of said valves have a greater area exposed to the field pressure of a certain compartment than to the fluid pressure of another compartment, whereby a lesser pressure in the first mentioned compartment than in the second mentioned compartment will operate the valve to establish a flow of fluid.

4. A shock absorber comprising, in combination, a casing providing a fluid reservoir and a piston chamber; a piston comprising a hub portion and a vane portion, said piston dividing the piston chamber into compression check and rebound check compartments respectively; a longitudinal passage through the hub portion of the piston; a metering pin adjustably supported in said passage and having a tapered inner end; a tubular member coaxial within said passage, having its one end restricted by the metering pin and providing a chamber in the piston passage which surrounds the tapered end of said pin; a spring-loaded valve slidably supported within the piston passage, said valve having a conical protuberance yieldably maintained against the other end of the tubular member normally to close it; a recess in the piston, a duct connecting the recess and the compression check compartment; a duct connecting said recess with the space between the said spring-loaded valve and the tubular member; a valve in the recess, having a protuberance yieldably urged to close the duct leading to the compression check compartment; a duct leading from the chamber around the tapered end of the metering pin to the compression check compartment; a duct leading from the space between the spring-loaded valve and tubular member to the compression check chamber; and a duct leading from the interior of the tubular member to the rebound check compartment.

5. A shock absorber comprising, in combination, a casing providing a fluid reservoir and a piston chamber; a piston dividing the piston chamber into compression check and rebound check compartments; a passage provided coaxially of the piston, and having four portions of different diameters; a tubular member fitting tightly within one portion of the said piston passage; an adjustable pin having a tapered end extending into one end of the tubular member to provide a restriction at this end of said tubular member; a spring loaded valve slidably supported within another portion of the said piston passage, said valve having a central lug normally closing the one end of the tubular member; a recess in the piston, spaced from but substantially parallel to the said piston passage, said recess comprising two portions of different diameters; a spring-loaded valve slidably supported within said recess, and having a protuberance normally closing the smaller diameter portion of the recess; a duct in the piston connecting the compression check compartment with the pin controlled end of the tubular member; a duct in the piston connecting the compression check compartment with the space between the tubular member and its cooperating spring loaded valve; a duct in the piston connecting the compression check compartment with the smaller diameter portion of the said recess provided in the piston; a duct connecting the spaces ahead of each spring loaded valve; a duct connecting the spaces behind each spring loaded valve and with the fluid reservoir; and a duct connecting the rebound check compartment with the interior of the tubular member.

6. A shock absorber comprising, in combination, a casing having a piston chamber containing a fluid; a piston movable within said chamber and dividing it into two compartments; a duct in the piston providing communication between said compartments; a piston valve yieldably closing said duct, said valve having a greater area exposed to the portion of the duct leading to one compartment than to the other, whereby a lesser pressure within said one compartment is necessary to operate the valve and establish a flow of fluid through said duct than in the other compartment.

7. A shock absorber comprising, in combination, a casing having a piston chamber containing a fluid; a piston movable within said chamber and dividing it into two compartments; a duct in the piston providing communication between said compartments; a piston valve carried by the piston and yieldably urged to close said duct, said valve being so constructed and arranged that fluid pressure from either compartment will move said valve to open the passage, a higher pressure being neccessary in one compartment, however, than in the other to effect the said opening.

8. A shock absorber comprising, in combination, a casing having a piston chamber containing a fluid; a piston movable within said chamber and dividing it into two compartments; a duct in the piston providing communication between said compartments; a double-headed piston valve yieldably urged to close said duct against flow in either direction, one of said piston valve heads being smaller in area than the other, the smaller head portion being exposed to the fluid pressure of one compartment and the larger head portion to the fluid pressure of the other compartment.

9. A shock absorber comprising, in combination, a casing presenting a piston chamber; a piston movable within said chamber and dividing it into two compartments; ducts in the piston providing communication between said compartments; and a spring-loaded plunger valve normally urged to close one of said ducts, said valve having a lesser area exposed to the duct it closes than to another of said ducts, whereby a greater fluid pressure is required in the one compartment than in the other to move said valve to open communication between said compartments.

10. A shock absorber comprising, in combination, a casing presenting a piston chamber; a piston movable within said chamber and dividing it into two compartments, said piston having a coaxial passage comprising two portions of different diameters; a duct leading from the smaller diameter passage to one compartment; another duct leading from the larger diameter passage portion to the other compartment; a plunger valve in said larger diameter portion of the passage, said plunger valve having a central lug extending from its end for closing the smaller diameter portion of the passage from the larger diameter portion, said lug maintaining the plunger valve so that the duct, leading into said larger diameter portion of the passage is constantly open; and a spring urging the valve to close the one duct.

11. A shock absorber comprising, in combination, a casing presenting a piston chamber; a piston movable within said chamber and dividing it into two compartments; said piston having two recesses each comprising portions of different diameters; a duct in the piston connecting the inner ends of the two larger diameter portions of said recesses; a duct connecting the smaller diameter portion of one recess with one compartment; a duct connecting the larger diameter portion of said recess with the other compartment; a duct connecting the smaller diameter portion of the other recess with the last mentioned compartment; and a spring-loaded plunger valve in each larger diameter portion of the recesses, each valve having an extending central lug portion fitting into and closing the respective smaller portion of its recess, the one plunger valve always maintaining open the duct leading into the larger diameter portion of its recess.

In testimony whereof I hereto affix my signature.

EDWIN F. ROSSMAN.